June 7, 1966  M. O'BRIEN  3,254,755
PORTABLE AUTOMATIC BIN FILLER
Filed Nov. 7, 1963  2 Sheets-Sheet 1
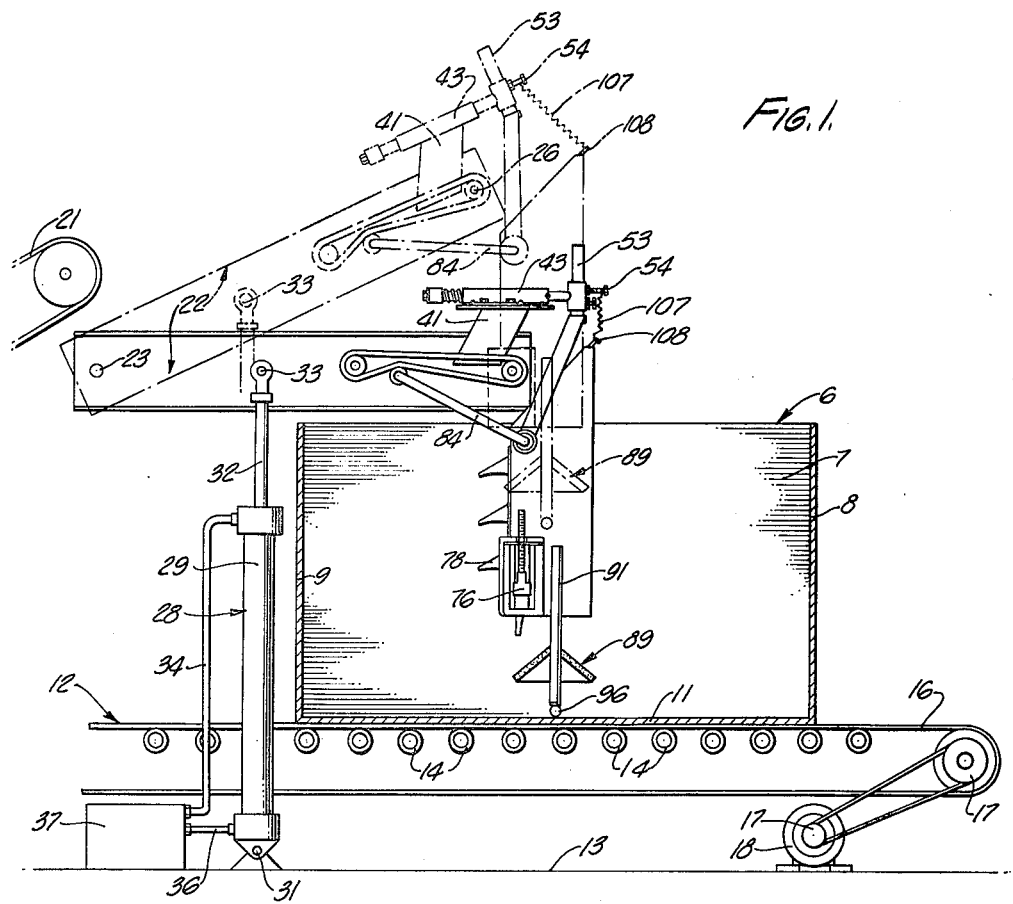
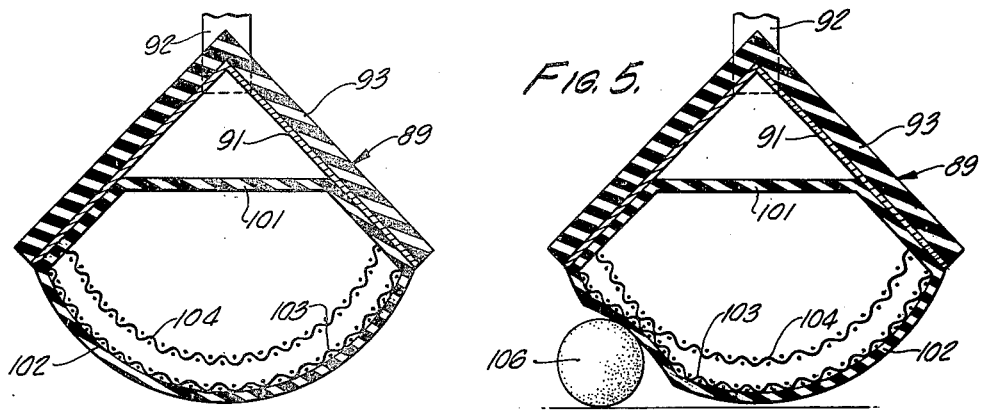
INVENTOR.
MICHAEL O'BRIEN
BY Lothrop & West
ATTORNEYS

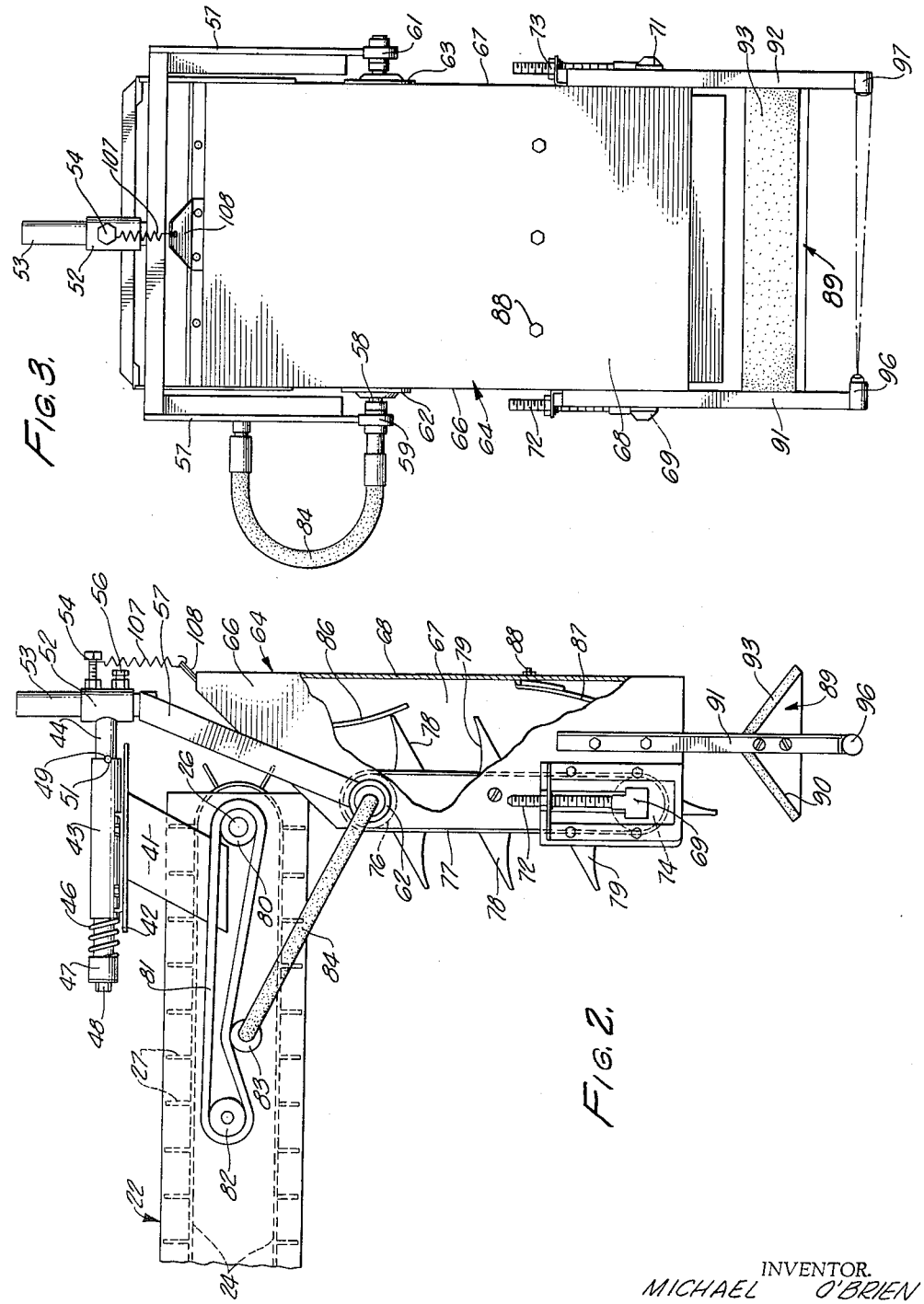

United States Patent Office 3,254,755
Patented June 7, 1966

3,254,755
PORTABLE AUTOMATIC BIN FILLER
Michael O'Brien, Davis, Calif., assignor to The Regents of the University of California, Berkeley, Calif.
Filed Nov. 7, 1963, Ser. No. 322,189
9 Claims. (Cl. 198—91)

The invention relates to means especially useful in handling produce in packing houses or in the field, and is especially concerned with certain fruits or vegetables which must be handled delicately in order to avoid damage from bruising or impact. A representative product is a tomato, which normally is picked in such condition that it is susceptible to substantial damage unless very carefully handled.

It has become the practice recently to handle produce in the field and in packing houses in bulk bins of relatively large capacity and dimensions. Produce which is simply dropped or dumped into the bins is liable to damage itself and may in turn cause damage to produce previously received and lodged in the bin. Various means have been proposed and employed to alleviate some of this difficulty and some of them have been fairly successful, although in general there are still drawbacks.

It is therefore an object of the invention to provide a portable automatic bin filler which will handle the produce in such a way as to deliver it with so little force as to obviate damage not only to the produce being handled, but also to produce which might already have been lodged in the bulk bin.

Another object of the invention is to provide a portable automatic bin filler which can be coordinated and utilized with produce handling equipment of the types already utilized in the field and in packing houses.

Another object of the invention is to provide a portable automatic bin filler which will be capable of handling a relatively large quantity of produce.

A still further object of the invention is to provide a portable automatic bin filler which can, if desired, be independently incorporated or, alternatively, can be utilized as an attachment to already existing mechanisms.

Another object of the invention is to provide a portable automatic bin filler which will be affected by the degree of filling of a bin and will be operated automatically in an according fashion to alleviate any severe handling of the produce.

A still further object of the invention is to provide a portable automatic bin filler which can readily be manufactured in a simple, straight-forward fashion so that it can easily and readily be serviced, if necessary, in the field and by unskilled mechanics.

Other objects of the invention together with the foregoing are attained in the embodiments thereof described in the accompanying description and illustrated in the accompanying drawings, in which:

FIGURE 1 is a side elevation of a portable automatic bin filler constructed pursuant to the invention, certain portions being shown in cross section on a longitudinal vertical plane;

FIGURE 2 is a side elevation of a portion of the structure shown in FIGURE 1, the view being to an enlarged scale and having a portion broken away to disclose the interior arrangement;

FIGURE 3 is a front elevation of the structure shown in FIGURE 2;

FIGURE 4 is a cross section on a vertical longitudinal plane of an alternative form of deflector and detector mechanism shown in relaxed position; and FIGURE 5 is a view similar to FIGURE 4 but showing the arrangement in energized or active position.

While the portable automatic bin filler pursuant to the invention can be embodied in various ways, depending largely on the particular produce to be handled, it has with considerable success been embodied in the form shown herein, primarily for use in connection with the handling of tomatoes.

In accordance with current practice, the tomatoes when harvested from the vines are to be received in bins 6. These are relatively large, wooden containers, each having a pair of side walls 7, a forward wall 8, a rearward wall 9 and a bottom wall 11. The height of the walls 7, 8 and 9 is such that a tomato dropped from the upper end thereof onto the bottom 11 would be very seriously damaged and would then be downgraded. If there were already a single layer of tomatoes on the bottom of the bin, a tomato dropped over the upper edge of the walls 8 or 9 and landing on those on the bottom would not only damage itself, but might also damage several other tomatoes on the bottom. To avoid this sort of injury, the portable automatic bin filler is provided.

For use in a packing house, for example, a conveyor 12 is mounted on the floor 13. The conveyor has a number of supporting rollers 14 as well as an advancing belt 16 driven through a pulley mechanism 17 by an electric motor 18. This arrangement advances the bin 6 from left to right in FIGURE 1 under the control of the motor 18.

Usually part of the packing house machinery is a supply conveyor 21 bringing the tomatoes to the bin filler. A main conveyor frame 22 is mounted for movement in a vertical plane about a cross axle 23 disposed just under the discharge end of the conveyor 21. The main frame 22 carries a conveyor belt 24 trained around appropriate drums (not shown), one of which is coaxial with the axle 23, and the other of which revolves about a shaft 26. The conveyor 24 is preferably provided with a number of flights 27 forming compartments so that the produce conveyed cannot roll when the conveyor is inclined.

The main frame 22 in one position is at an elevation above the top of the bin 6 and is movable into a raised position. Connected to the main frame 22 is a hydraulic jack 28. This includes a cylinder 29 at its lower end connected by a pivot 31 to a bracket on the floor 13. Also included is a piston rod 32 joined by a pivot pin 33 to the main frame. By means of suitable conduits 34 and 36 the jack 28 is connected to a source 37 of hydraulic fluid under pressure and under appropriate control. The main frame 22 can be swung about the axle 23 between the full line position and the dotted line position shown in FIGURE 1, and can be raised even higher to clear the bin.

Means are provided for gently transferring the tomatoes from the main conveyor belt 24 to the interior of the bin 6. The main frame 22 near its outboard or free end is provided with a bridge 41 extending over the conveyor belt 24 and carrying a platform 42 on which a sleeve 43 is fastened. The sleeve is disposed with its axis extending in a longitudinal direction and substantially parallel to the frame 22. Slidable within the sleeve 43 is a plunger 44 urged in one direction by a coil spring 46 abutting one end of the sleeve 43 and also abutting a collar 47 secured to the end of the plunger 44 by a plug 48. A cross pin 49 pierces the plunger 44 and in one position of rotation about the axis of the sleeve 43 engages notches 51. The plunger 44 can be revolved about the longitudinal axis, dislodging the pin 49 from the notches 51 whenever there is a superior force so acting. Normally, the parts remain assembled and stationary in position as indicated. At the end of the plunger 44 there is a collar 52 serving as a mounting for a stub shaft 53 able to move on an axis at right angles to the axis of the plunger 44. A pair of set screws 54 and 56 with appropriate locking nuts is provided to hold the stub shaft 53 in any desired adjusted position with regard to the axis of the plunger 44.

Secured to the lower end of the stub shaft 53 is a yoke 57 with a pair of depending arms far enough apart to clear the main frame 22. At its lower end, the yoke 57 supports a cross shaft 58 (FIGURE 3) carried in appropriate bearings 59 and 61 for rotation, under normal conditions, about a substantially horizontal axis parallel to the axis of the conveyor shaft 26.

Freely journalled on the cross shaft 58 by bearings 62 and 63 is a hanging conveyor frame 64. This is conveniently a channel-shaped member having a pair of side walls 66 and 67 and a forward wall 68. The frame is unsymmetrical with respect to the axis of the shaft 58 but in operation is substantially balanced to hang vertically. Disposed on the hanging conveyor frame are movable bearings 69 and 71 having adjusters 72 and 73 for locating a lower conveyor roller 74. The axis of the roller 74 is parallel to the axis of the shaft 58. Within the frame and between the bearings 62 and 63 and fastened on the shaft 58 is a roller 76. This, with the roller 74, serves to mount a flight conveyor belt 77. This is a flexible member having a number of extending flights 78 with reinforcing side walls 79 to serve as pockets so that produce therein cannot be jostled out, but will be substantially retained. The upper end of the flight conveyor belt is disposed just below the discharge end of the conveyor belt 24.

Means are provided for driving or operating the flight conveyor belt 77 in conjunction or concurrence with the operation of the conveyor belt 24 despite swinging movement of the hanging conveyor frame about the axis of the shaft 58, and despite lateral swinging movement of the hanging conveyor frame about the axis of the plunger 44. For this reason and to take the direction of travel into account, on the end of the shaft 26 is secured a pulley 80 engaged with a belt 81 trained around an idler pulley 82 on the main frame 22. The belt 81 also runs over a driven pulley 83 at one end of a section of flexible shafting 84. The other end of the flexible shafting is joined to the shaft 58. Thus, when the top run of the conveyor belt 24 advances from left to right in FIGURE 2, the shaft 58 is rotated so that the run of the flight conveyor belt within the housing of the hanging conveyor frame travels downwardly or constitutes the lowering or descending run thereof.

Thus when the tomatoes are discharged from the conveyor belt 24 as the belt rounds the end drum, the fruit does not fall far, but is gently lodged in a pocket formed by the immediately subjacent flight 78 on the descending run of the flight conveyor 77. To make sure that each tomato directly lodges in its proper position, a deflector 86, preferably constituted of a section of belting or the like, is secured at a convenient point interiorly of the hollow hanging conveyor frame. The deflector is flexible and yields to the tips of the flights 78 and serves as a baffle and guide for tomatoes being transferred from the conveyor belt 24 onto the conveyor belt 77. In a similar fashion, another deflector 87 is secured by a fastening 88 to a lower portion of the hanging conveyor frame to assist in the directional discharge of tomatoes from the flight conveyor as the conveyor rounds the lower drum 74.

Tomatoes released from the lower portion of the flight conveyor belt do not descend directly into the interior of the bin 6. Rather, they encounter a baffle 89 or deflector having a plate 90 with an upwardly directed apex and supported on a pair of side arms 91 and 92 depending from the hanging conveyor frame 64. The baffle 89 includes not only a supporting plate, but also a resilient cover 93 preferably of a material such as foam urethane or foam rubber. The deflector affords random diversion both to one side and the other of tomatoes released from the flight conveyor belt.

Also provided are means for automatically lifting the conveying structure when sufficient tomatoes have been deposited in the bin 6, the deposited tomatoes then being considered at an obstruction. In one version of this arrangement, there is provided a light source 96 on the lower extremity of the arm 91 to direct a light beam transversely and horizontally to an electric eye 97 at the lower end of the arm 92. These devices are appropriately connected in electric circuits in a well-known manner. As long as the beam continues, there is no change in the position of the structure. When sufficient tomatoes have lodged on the bottom 11 of the bin beneath the deflector 89 to interrupt the light beam, the interruption is a signal to the controlling mechanism 37 for the hydraulic jack 28 to extend the piston rod 32. The main conveyor frame 22 and the hanging conveyor frame are correspondingly lifted. The lift continues until the light beam is reestablished and usually is about equal to the height of one layer of tomatoes. There is a repetition of the raising function each time the beam of light is interrupted until the deflector and light beam structure gets just above the top of the bin 6. When that occurs, the conveyor belts 24 and 77 are halted and the filled bin 6 is advanced and replaced by an empty bin. The jack 28 lowers the frame 22 and the cycle is repeated.

In another form of responsive mechanism, particularly as shown in FIGURES 4 and 5, the light source 96 and the electric eye 97 are dispensed with. Instead, there is positioned on or immediately beneath the deflector 89 a different form of responsive mechanism. An insulating, flexible tube 101 is secured on the under side of the plate 90 forming the frame of the deflector. The tube forms a deformable envelope having an arcuate lower contour 102. Within the envelope is an outer, flexible metallic mesh 103 connected in one part of the electrical circuit which controls the hydraulic mechanism 37. Also disposed within the envelope is an interior, flexible metallic mesh 104. This is connected in the electrical circuit to the hydraulic control mechanism 37. Normally, the position of the screens 103 and 104 is with them spaced apart and the electrical circuit is not complete. When an obstruction 106 such as a tomato comes into gentle contact with any portion of the outer tube 101, that portion is substantially deflected and deflects the outer screen 103 to bring it into physical contact with the inner screen 104. The electrical circuit is thus completed and the control mechanism 37 is actuated to operate the jack 28 to lift the main conveyor and the hanging conveyor.

While either detecting or sensing device operates well, the screen switch shown in FIGURES 4 and 5 is responsive to an obstruction beneath any portion of the deflector, whereas the light beam shown in FIGURE 3 is affected by tomatoes centered beneath the deflector. The advantage of the light beam arrangement is that no physical contact with the produce is necessary to actuate the mechanism, whereas physical contact is necessary with the structure shown in FIGURES 4 and 5. However, the envelope and exterior screen are sufficiently limber so that the force required is quite small and for all but the most delicate items the arrangement of FIGURES 4 and 5 is satisfactory.

In the usual operation of this device, the jack 28 is actuated to extend the piston rod 32 and lift the main frame 22 so as to hoist the hanging conveyor frame to its maximum and well above the upper level of a bin. A bin 6 is then brought into position substantially as shown in FIGURE 1. The jack 28 is again actuated to lower the structure until the members 91 and 92 are substantially in abutment with the bottom wall 11. Then the conveyor belt 24 is operated and simultaneously operates the conveyor 77. The tomatoes are transferred from the conveyor belt 24 gently to the pockets 79 on the conveyor 77 and are then discharged onto the deflector and go to either side thereof. As soon as the tomatoes interrupt the light beam or contact the tube 101, the control 37 causes the jack 28 to lift the entire structure until the obstruction is cleared. The lift is repeated until the detector or sensing device is poised above the top of the bin 6. Following this, the filled bin is discharged and is replaced by a successive empty bin and the cycle repeats.

Often the structure is not used in a packing house where it is well protected, but is applied to a truck or pick-up machine travelling in the field and is operated in connection with a bin on the same or a different truck. There may be considerable bumping or jouncing, but the mounting of the hanging conveyor frame is such that it will still hang freely by gravity and operate substantially in a vertical orientation even though the main frame 22 may be cocked at an angle either longitudinally or transversely. The shaft 44 can yield and rotate about its axis within the sleeve 43, bringing the pin 49 out of its sockets 51. The weight of the hanging conveyor frame is sufficient, particularly when it is loaded, to achieve this result, so that the tomatoes are always lowered substantially in a vertical direction. Whenever the parts are restored to their normal positions, the pin 49 snaps back into the notches 51 under the influence of the spring 46.

The hanging conveyor frame may be struck or otherwise diverted from its location or may be out of balance from time to time. A coil spring 107 is hung on the extending set screw 54 and is hooked into an eye 108 at the upper corner of the hanging conveyor frame 64. Thus even though the frame is not completely balanced or symmetrical, and even though there may be relatively heavy produce on the down run of the conveyor, still the spring 107 tends to keep the hanging conveyor frame substantially in a vertical orientation. Sometimes due to rough field handling, the hanging conveyor frame is banged against either the sides or the ends of the bin 6 and is violently dislodged from its normal position. The flexible, hanging mounting of the flight conveyor frame permits temporary yielding to such otherwise damaging forces and promptly allows restoration of the parts to normal operating positions.

What is claimed is:

1. A portable automatic bin filler comprising a main frame adapted to be raised and lowered, a hanging conveyor frame, means for mounting said hanging conveyor frame on said main frame for swinging movement about a longitudinal axis and about a predetermined transverse axis, a flight conveyor belt, means for mounting said flight conveyor belt on said hanging conveyor frame for operation about a pair of transverse axes one of which is said predetermined transverse axis, a drive mechanism on said main frame, means including a flexible drive shaft for operating said flight conveyor belt from said drive mechanism, means for raising and lowering said main frame, and means on said hanging conveyor frame for detecting an obstruction beneath said hanging conveyor frame and actuating said raising means.

2. A portable automatic bin filler comprising a main frame adapted to be raised and lowered, means for raising and lowering said main frame, a hanging conveyor frame, means for supporting said hanging conveyor frame on said main frame for swinging movement to and fro and transversely, a flight conveyor belt, means for mounting said flight conveyor belt on said hanging conveyor frame for operation in an approximately vertical attitude, a drive mechanism on said main frame, means for operating said flight conveyor belt from said drive mechanism, means on said hanging conveyor frame for detecting an obstruction beneath said hanging conveyor frame, and means controlled by said detecting means for operating said raising and lowering means.

3. A portable automatic bin filler comprising a main frame adapted to be raised and lowered, a main conveyor on said main frame adapted to discharge over one end of said main frame, a hanging conveyor frame, means for suspending said hanging conveyor frame from said end of said main frame for swinging movement to and fro and transversely, a flight conveyor belt, means for mounting said flight conveyor belt on said hanging conveyor frame for operation in an approximately vertical attitude and in position to receive objects discharged from said main conveyor, means for driving said flight conveyor belt from said main conveyor belt, means for detecting an obstruction beneath said hanging conveyor frame, and means controlled by said detecting means for raising said main frame.

4. A portable automatic bin filler comprising a main frame, a bridge on said main frame, a hanging conveyor frame, a yoke pivotally connected to the upper end of said hanging conveyor frame, means for pivotally connecting said yoke and said bridge, a flight conveyor belt on said hanging conveyor frame and having a descending run adapted to operate in an approximately vertical attitude, a deflector depending from said hanging conveyor frame and disposed beneath said descending run, means for detecting an obstruction beneath said hanging conveyor frame, and means controlled by said detecting means for raising said main frame.

5. A portable automatic bin filler comprising a main frame, a hanging conveyor frame, means for suspending said hanging conveyor frame from said main frame for movement in various horizontal directions, means on said hanging conveyor frame for lowering objects thereon, means depending from said hanging conveyor frame for deflecting lowered objects discharged by said lowering means, and means operated by an obstruction beneath said hanging conveyor frame for raising said main frame.

6. A portable automatic bin filler comprising a main frame, a hanging conveyor frame, means for suspending said hanging conveyor frame from said main frame for movement in various horizontal directions, means on said hanging conveyor frame for lowering objects thereon in an approximately vertical direction, and means on said hanging conveyor frame beneath said lowering means for deflecting lowered objects discharged by said lowering means in either of two directions.

7. A portable automatic bin filler comprising a main frame, a conveyor on said main frame and adapted to discharge over one end thereof, a bridge on said main frame spanning said conveyor adjacent said one end, a hanging conveyor frame, a flight conveyor belt on said hanging conveyor frame, a yoke on said hanging conveyor frame spanning said flight conveyor belt, means interconnecting said bridge and said yoke for relative pivotal movement about a plurality of axes, means for connecting said conveyor and said flight conveyor belt for simultaneous operation, and means on said hanging conveyor frame for detecting obstructions beneath said hanging conveyor frame.

8. A portable automatic bin filler comprising a main frame, a conveyor on said main frame and adapted to discharge over one end thereof, a bridge on said main frame spanning said conveyor adjacent said one end, a hanging conveyor frame, a flight conveyor belt on said hanging conveyor frame, a yoke on said hanging conveyor frame spanning said flight conveyor belt, means interconnecting said bridge and said yoke for relative pivotal movement about a plurality of axes means for connecting said conveyor and said flight conveyor belt for simultaneous operation, means on said hanging conveyor frame for detecting obstructions beneath said hanging conveyor frame, and means for raising said hanging conveyor frame in response to operation of said detecting means.

9. A portable automatic bin filler comprising a main frame, a conveyor on said main frame and adapted to discharge over one end thereof, a bridge on said main frame spanning said conveyor adjacent said one end, a hanging conveyor frame, a flight conveyor belt on said hanging conveyor frame, a yoke on said hanging conveyor frame spanning said flight conveyor belt, means interconnecting said bridge and said yoke for relative movement, means for connecting said conveyor and said flight conveyor belt for simultaneous operation, means for detecting obstructions beneath said hanging conveyor frame, and means for moving said hanging conveyor frame away from said obstructions in response to operation of said detecting means.

References Cited by the Examiner

UNITED STATES PATENTS

| | | | |
|---|---|---|---|
| 2,355,213 | 8/1944 | Flanagan | 198—96 X |
| 2,800,991 | 7/1957 | Manierre | 198—5 |
| 3,147,846 | 9/1964 | Huntoon | 198—69 X |

FOREIGN PATENTS 459,899  1/1937  Great Britain.

SAMUEL F. COLEMAN, *Primary Examiner.*

WILLIAM B. LABORDE, *Examiner.*

E. A. SROKA, *Assistant Examiner.*